US011248851B2

(12) United States Patent
Stansbury (10) Patent No.: US 11,248,851 B2
(45) Date of Patent: Feb. 15, 2022

(54) ENERGY STORAGE DEVICE (71) Applicant: Westinghouse Electric Company LLC, Cranberry Township, PA (US)

(72) Inventor: Cory A. Stansbury, Gorham, ME (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 231 days.

(21) Appl. No.: 15/979,628

(22) Filed: May 15, 2018

(65) Prior Publication Data

US 2018/0372423 A1 Dec. 27, 2018

Related U.S. Application Data (60) Provisional application No. 62/522,737, filed on Jun. 21, 2017.

(51) Int. Cl.
*F28D 20/00* (2006.01)
*F28F 21/04* (2006.01)

(52) U.S. Cl.
CPC .......... *F28D 20/0056* (2013.01); *F28F 21/04* (2013.01); *F28D 2020/0021* (2013.01); *F28D 2020/0069* (2013.01); *F28D 2020/0078* (2013.01)

(58) Field of Classification Search
CPC ......... F28D 20/0056; F28D 2020/0021; F28D 2020/0069; F28D 2020/0078; F28F 21/04
USPC .......................................................... 165/10
See application file for complete search history.

(56) References Cited

U.S. PATENT DOCUMENTS

| | | | |
|---|---|---|---|
| 3,854,186 A | 12/1974 | Sergeys | |
| 4,379,109 A | 4/1983 | Simpson | |
| 4,993,481 A * | 2/1991 | Kamimoto | C04B 38/0006 126/643 |
| 5,184,669 A * | 2/1993 | Tamme | F28D 20/003 165/10 |
| 5,222,298 A * | 6/1993 | Schatz | F28D 20/021 165/10 |
| 5,239,839 A | 8/1993 | James | |
| 5,826,650 A | 10/1998 | Keller et al. | |
| 6,079,481 A | 6/2000 | Lowenstein et al. | |
| 6,343,485 B1 * | 2/2002 | Duerr | B60H 1/005 62/430 |
| 7,144,557 B2 * | 12/2006 | Yada | B01J 8/06 422/652 |

(Continued)

FOREIGN PATENT DOCUMENTS

| | | |
|---|---|---|
| DE | 8630338 U1 | 6/1987 |
| DE | 102009036550 A1 | 5/2010 |

(Continued)

OTHER PUBLICATIONS

International Search Report and Written Opinion of the International Searching Authority dated Sep. 13, 2018 for PCT/US2018/032685 (Forms PCT/ISA/220, PCT/ISA/210, PCT/ISA/237).

(Continued)

*Primary Examiner* — Tho V Duong
*Assistant Examiner* — Raheena R Malik
(74) *Attorney, Agent, or Firm* — K&L Gates LLP (57) ABSTRACT

A method and apparatus for storing thermal energy by flowing a heat transfer medium horizontally over and between a plurality of relatively thin concrete plates in parallel flow paths.

20 Claims, 5 Drawing Sheets

(56) References Cited

U.S. PATENT DOCUMENTS

| | | | |
|---|---|---|---|
| 7,156,155 B2* | 1/2007 | Kudo | F28D 20/00 165/10 |
| 7,222,659 B2* | 5/2007 | Levin | F28D 20/021 165/10 |
| 7,406,998 B2* | 8/2008 | Kudo | F28D 20/02 165/10 |
| 8,201,615 B2 | 6/2012 | Soukhojak et al. | |
| 9,151,545 B2* | 10/2015 | Soukhojak | C09K 5/04 |
| 10,471,803 B2 | 11/2019 | Bidner et al. | |
| 10,591,224 B2 | 3/2020 | Bergan et al. | |
| 2008/0105417 A1 | 5/2008 | Deaver | |
| 2009/0090109 A1 | 4/2009 | Mills et al. | |
| 2009/0294092 A1 | 12/2009 | Bahl et al. | |
| 2011/0016858 A1* | 1/2011 | Gaiser | F01N 3/2814 60/320 |
| 2011/0200156 A1 | 8/2011 | Hyde et al. | |
| 2011/0200159 A1 | 8/2011 | Hyde et al. | |
| 2011/0286724 A1 | 11/2011 | Goodman | |
| 2012/0168111 A1* | 7/2012 | Soukhojak | F28D 20/023 165/10 |
| 2012/0312292 A1 | 12/2012 | Bahl et al. | |
| 2013/0105106 A1* | 5/2013 | Goswami | F28D 20/026 165/10 |
| 2014/0110080 A1 | 4/2014 | Bergan | |
| 2014/0284021 A1 | 9/2014 | Laurberg et al. | |
| 2014/0366536 A1 | 12/2014 | Muren | |
| 2015/0052931 A1 | 2/2015 | Said et al. | |
| 2015/0192370 A1* | 7/2015 | Suzuki | F28D 20/0056 165/10 |
| 2016/0116188 A1* | 4/2016 | O'Donnell | F24S 60/00 126/714 |
| 2018/0372423 A1 | 12/2018 | Stansbury | |
| 2019/0249932 A1* | 8/2019 | Bernehed | F28D 20/0056 |

FOREIGN PATENT DOCUMENTS

| | | |
|---|---|---|
| DE | 102011007335 A1 | 10/2012 |
| EP | 2017561 A2 | 1/2009 |
| EP | 2522047 A1 | 11/2012 |
| EP | 3247963 A1 | 11/2017 |
| WO | 02/01132 A2 | 1/2002 |
| WO | 2010051682 A1 | 5/2010 |
| WO | 2011079936 A2 | 7/2011 |
| WO | 2012140015 A1 | 10/2012 |
| WO | 2014026559 A1 | 2/2014 |
| WO | 2016065191 A1 | 4/2016 |
| WO | 2018077842 A1 | 3/2018 |

OTHER PUBLICATIONS

Brown, Bradley M., "Development of a Structured Concrete Thermocline Thermal Energy Storage System", Dec. 2011, 119 pp., University of Arkansas, Fayetteville, http://scholarworks.uark.edu/etd.

John, Emerson Esmond, "The Development of a High Performance Concrete to Store Thermal Energy for Concentrating Solar Power Plants", Aug. 2012, 194 pp., University of Arkansas, Fayetteville, http://scholarworks.uark.edu/etd.

John, Emerson, "Concrete as a thermal energy storage medium for thermocline solar energy storage systems", Solar Energy, Oct. 2013, 1-2 pp., vol. 96, Published by Elsevier Ltd.

Dr. R. Panneer Selvam, "Development and Performance Evaluation of High Temperature Concrete for Thermal Energy Storage for Solar Power Generation", 32 pp., University of Arkansas, Fayetteville.

International Search Report and Written Opinion for International PCT Application No. PCT/US2020/040706, dated Oct. 27, 2020.

Supplementary European Search Report for corresponding European Patent Application No. EP1882072.6, dated Mar. 2, 2021.

* cited by examiner

ENERGY STORAGE DEVICE

CROSS REFERENCE TO RELATED APPLICATION

This application claims the benefit of U.S. Provisional Patent Application No. 62/522,737, filed Jun. 21, 2017.

BACKGROUND

1. Field

This invention pertains generally to energy storage and, more particularly, to a modular, low cost, thermal energy storage device.

2. Related Art

The creation of energy storage to levelize power on the electrical grid, avoiding the need for large amounts of spinning reserve, has been an extreme challenge. Due to an ever increasing roll-out of non-dispatchable renewable energy devices, like solar photovoltaic cells and wind turbines, grid stability has suffered. Traditional energy storage solutions, such as pumped storage and batteries, have either exhausted their capacity or are prohibitively difficult to cite due to environmental concerns. By storing energy as heat, from the sources of heat used to generate electricity, created just prior to the generation of electricity, rather than the storing of electricity, relatively low-cost storage may be achieved and utilized by a reactor in a nuclear power plant. Thermal storage in and of itself is not new, but what has been elusive is a design that can efficiently store energy in relatively low-cost modules using common materials, rather than expensive salts or geologic formations, which may not exist everywhere. Accordingly, it is an object of this invention to provide a low-cost, modular energy storage device that is constructed from common, easily acquired materials.

SUMMARY

These and other objects are achieved by an energy storage device comprising: a plurality of plates comprised of a concrete-like material, supported in tandem with a flow space there between large enough to pass a heat transfer medium substantially over a face of the plates. An inlet plenum, in fluid communication with a first end of the flow space, is configured to receive the heat transfer medium from a source and distribute the heat transfer medium through the flow space over the face of the plates. An outlet plenum, in fluid communication with a second end of the flow space, is configured to receive the heat transfer medium from the flow space and dispense the heat transfer medium to a return destination; wherein a portion of heat in the heat transfer medium is transferred to the plates in a charging mode of operation, or a portion of the heat in the plates is transferred to the heat transfer medium in a discharging mode of operation.

In one embodiment, the plurality of plates are housed in a metal casing and, preferably, the plates are supported on opposite edges and extend horizontally so the heat transfer medium flows horizontally with the heat transfer medium flowing in parallel through the flow spaces between the plates. Preferably, the heat transfer medium is an oil or salt.

In another embodiment the plates are fluted in a direction perpendicular to the direction of flow of the heat transfer medium, with the flutes spaced along the length of the plates to provide thermal breaks, slowing thermal diffusion along the length of the plates following a partial charge, i.e., transfer of heat between an area of the plate containing heat and an area of the plate which does not contain as much heat. Preferably, the flutes are spaced six inches to four feet along the length of the plates. The energy storage device is desirably configured to operate approximately between 212° F. and 599° F. In such an embodiment the energy device is configured so the charging and discharging operation is respectively in an opposite fluid flow direction equivalent to a counter-flow heat exchanger's operation. In such an embodiment the concrete-like plates may comprise micro rebar or other similar three dimensional reinforcement. In a further embodiment at least some of the flow space between the plates includes insulation and/or sections of at least some of the plates are insulated from downstream sections of those plates to form the thermal breaks.

The invention also contemplates a method of storing thermal energy comprising the step of forming a heat transfer module having a plurality of heat transfer plates comprising a concrete-like material that are spaced from each other and supported in tandem to form a flow space there between, with the heat transfer plates enclosed within a housing having an inlet plenum at one end of the flow spaces and an outlet plenum at another end of the flow spaces. The method directs a heat transfer medium through the inlet plenum and over a face of and between the plurality of heat transfer plates; transfers heat from the heat transfer medium to the heat transfer plates; and exits the heat transfer medium from the housing through the outlet plenum.

Preferably, the directing step includes the step of directing the heat transfer medium in parallel, horizontally over and between the plurality of heat transfer plates. In one embodiment the method includes the step of reinforcing the heat transfer plates with micro rebar or other similar three dimensional reinforcement. Preferably, the method applies thermal breaks to the plates to retard diffusion of the heat along the length of the plates after a partial charge. In one embodiment, the thermal breaks are flutes that extend in a direction perpendicular to the direction of flow of the heat transfer medium. Preferably, the flutes are spaced six inches to four feet apart.

The method also operates the heat transfer module approximately between 212° F. and 599° F. The method may also include a charging and discharging operation that is respectively in an opposite fluid flow direction equivalent to a counter-flow heat exchanger's operation.

BRIEF DESCRIPTION OF THE DRAWINGS

A further understanding of the invention can be gained from the following description of the preferred embodiments when read in conjunction with the accompanying drawings in which:

FIG. 1 is a perspective view of a portion of the housing of the energy storage device of this invention showing several of the concrete plates in position with the flow space there between;

DESCRIPTION OF THE PREFERRED EMBODIMENT

This invention describes a method to store thermal energy in a modular way using low cost materials. It does so by aligning concrete plates 10 (shown in FIGS. 1, 2 and 3) of a thin cross section in close proximity to one another, forming flow channels 12 between the concrete plates. The concrete plates are then assembled in a low-cost metal module housing shell 20 with built-in guide slots 16 formed between adjacent separators 18, which maintain the spacing between the concrete plates 10 that form the flow channels 12. The shell 20 will be assembled and then two end caps 22 and 24 are positioned respectively at each end to the shell 20 and are affixed to the shell, such as by welding, forming a plenum 26 between the ends of the concrete plates 10 and each of the respective end caps 22 and 24. Sitting horizontally, the two plenums 26 and the channels 12 enable a heat transfer fluid (oil, salt, etc.) to be circulated, transferring energy to the concrete plates 10 in a thermal gradient which will move down the length of the assembly as the "charge level" increases. When heat is to be extracted, the flow will be reversed, allowing the device to operate like a counter-flow heat exchanger. Preferably, each of the concrete plates is fluted, i.e., grooved in the vertical direction substantially along the entire height of the plate, at each given distance along the length of the concrete plate to reduce the effect of a heat wave moving down the plate when the heat transfer fluid is not flowing. The given distance is preferably six inches to four feet, but can be longer, depending on the length of the module 100. The flutes 28 can be clearly observed in FIG. 2. Thin strips of material, including but not limited to insulating materials, figuratively represented in FIG. 1 by reference character 34, can also extend from one plenum to the other along the center of the flow channels 12 in order to tie the structure together and maintain plate spacing, while not negatively impacting performance characteristics. Insulation can also be embedded in the flutes 28 or replace the flutes altogether and tie adjacent sections of the heat transfer plates together. Though the concrete plates 10 are shown extending in the horizontal direction it should be appreciated that they could be configured, alternately, to extend in the vertical direction and still be within the scope of this invention, though the horizontal flow path is preferred.

Accordingly, one embodiment of this invention employs a concrete structure encased in metal casing 14 with a large surface to area ratio for storing thermal energy from a heat source such as a nuclear reactor. Preferably, the concrete plates 10 will include micro-rebar or other similar admixture to enhance strength, durability, and heat transfer. Alternatives to micro-rebar include steel, steel fibers fiberglass carbon fiber, other metals, composites and high temperature plastics. No piping need be utilized, but metal tubing or composite tubing may be employed as an alternative to the foregoing preferred channel 10 structure. All of the heat transfer medium within the module is directed by a metal casing or relatively thin concrete plates employed within the casing to store the heat. The concrete plates 10 may be constructed from ultra-high-performance concrete, high performance concrete, high-strength concrete or high-temperature concrete. Alternatively, the plates 10 can be constructed from firebrick, ceramic, solid salt or metals.

Flow channels for the heat transfer medium or fluid are formed between adjacent concrete plates, maximizing surface area and minimizing the thermal conductivity means and pumping power needed to drive the heat transfer medium. The separators 18 may be thin material strips, rods or bars and may be constructed out of high temperature plastic, metal, composites or fiberglass. Preferably, the heat transfer medium is unpressurized and comprised of an oil or salt with suitable properties as to not negatively interact with the concrete or metal structure, which can be treated with a protective coating to deter such an interaction. The heat transfer medium may be hydrocarbon based fluid such as Therminol, Duratherm H F, Calder 1, Mobiltherm, Paratherm, Dowtherm or Phillips 66, a silicone based fluid such as Duratherm S or Syltherm or a liquid salt such as Nitrate salts.

In one embodiment, the concrete plates are fluted along their height, i.e., perpendicular to the flow of the heat transfer medium, as to provide thermal breaks, slowing thermal diffusion between plates following a partial charge, i.e., a transfer of heat from the heat transfer medium to the concrete plates that only partially fills the capacity of the plates to store the heat. The thermal breaks impede the plates from equalizing the temperature across the plates, which otherwise, after a partial charge, would prevent a high quality recovery of the heat during a discharge. The housing 14 may be formed from plastic, coated carbon steel, stainless steel, composites or fiberglass and is preferably provided with insulation either layered within, around the inside or around the outside of the housing. The insulation may be an air gap in a multi-layered shell, fiberglass, Aerogel, ceramics, mineral fiber/wool or silica.

The energy storage device of this invention may be operated with the concrete plates 10 in either a horizontal or vertical orientation. Additionally, the shell 20, end caps 22 and 24 and the concrete plates 10 may be cast at the site of use, or the fully constructed housings 14 and the concrete plates 10 may be shipped separately and assembled on site, or any combination thereof.

Thermal energy will be loaded and unloaded from the fluted structure using a moving thermal gradient along the long axis of the concrete. Temperatures of operation will be as low as 212° F. and as high as 599° F. Charging and discharging operation will occur with opposite fluid flow direction as to resemble a counter-flow heat exchanger's operation. Micro rebar or similar admixture may be used in place of traditional concrete reinforcement, as to minimize manual labor and maximize production efficiency.

Preferably, the pressure of the incoming heat transfer medium is at atmospheric pressure or slightly above, that is 14.5 to 21.8 psia. The flow rate of the heat transfer medium, desirably, is approximately between 0-22.0 lbs/s and, preferably, about 3.9 lbs/s per module. The concrete plates are approximately between 0.5-3 inches thick and, more preferably, about 1.25 inches thick. The flow spaces are about between 0.04 inches and 0.4 inches and, more preferably, about ¹⁄₁₀ inch wide.

Figure 1:
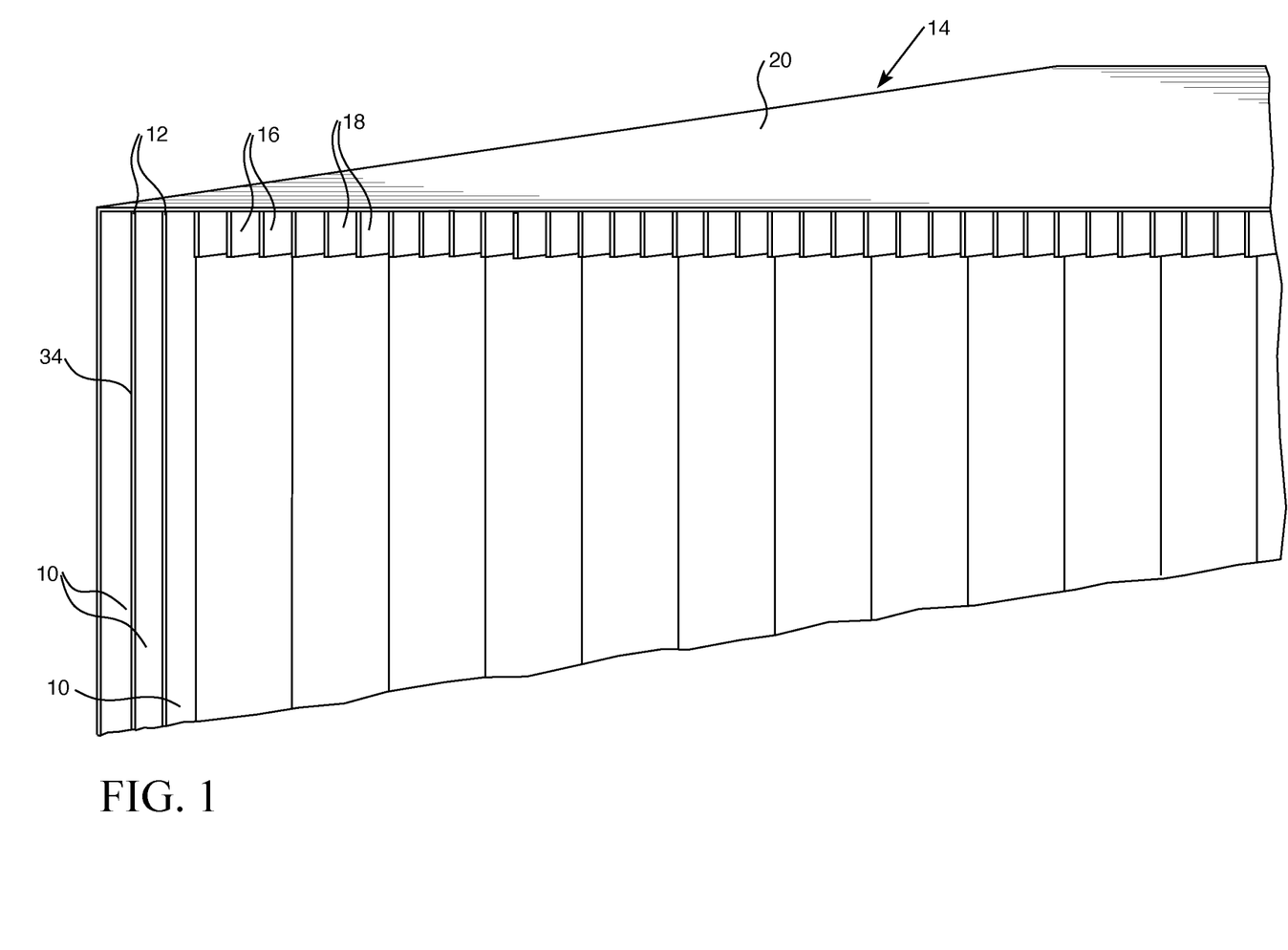

FIG. 1 shows the metal housing or casing 14 with three of the concrete plates 10 spaced by the modular guide slots 16 extending from the underside of the upper wall of the shell 20 portion of the casing 14, to form the flow spaces or channels 12 between the plates 10. The fluting 28 is shown as grooves extending vertically, however, the flow of the heat transfer medium preferably extends horizontally, in parallel through the flow spaces over substantially the entire faces of the concrete plates 10; however, it should be appreciated that the flow may also be directed vertically with a plenum on the top and bottom of the module.

Figure 2:
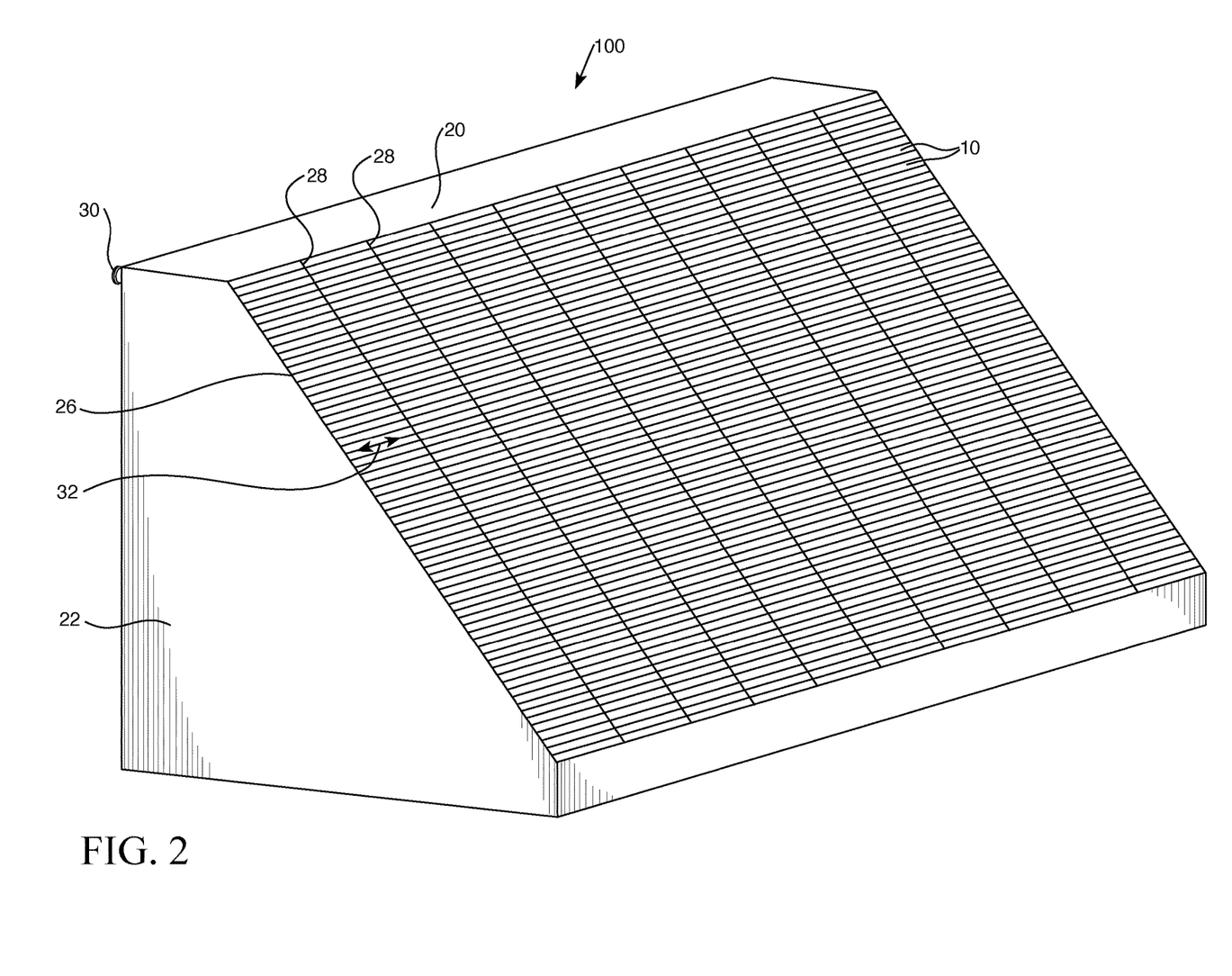
FIG. 2 shows a cutaway view of an entire module of the energy storage device of this invention including the intake plenum and all of the concrete plates that show the thermal breaks.
Figures 3, 4:
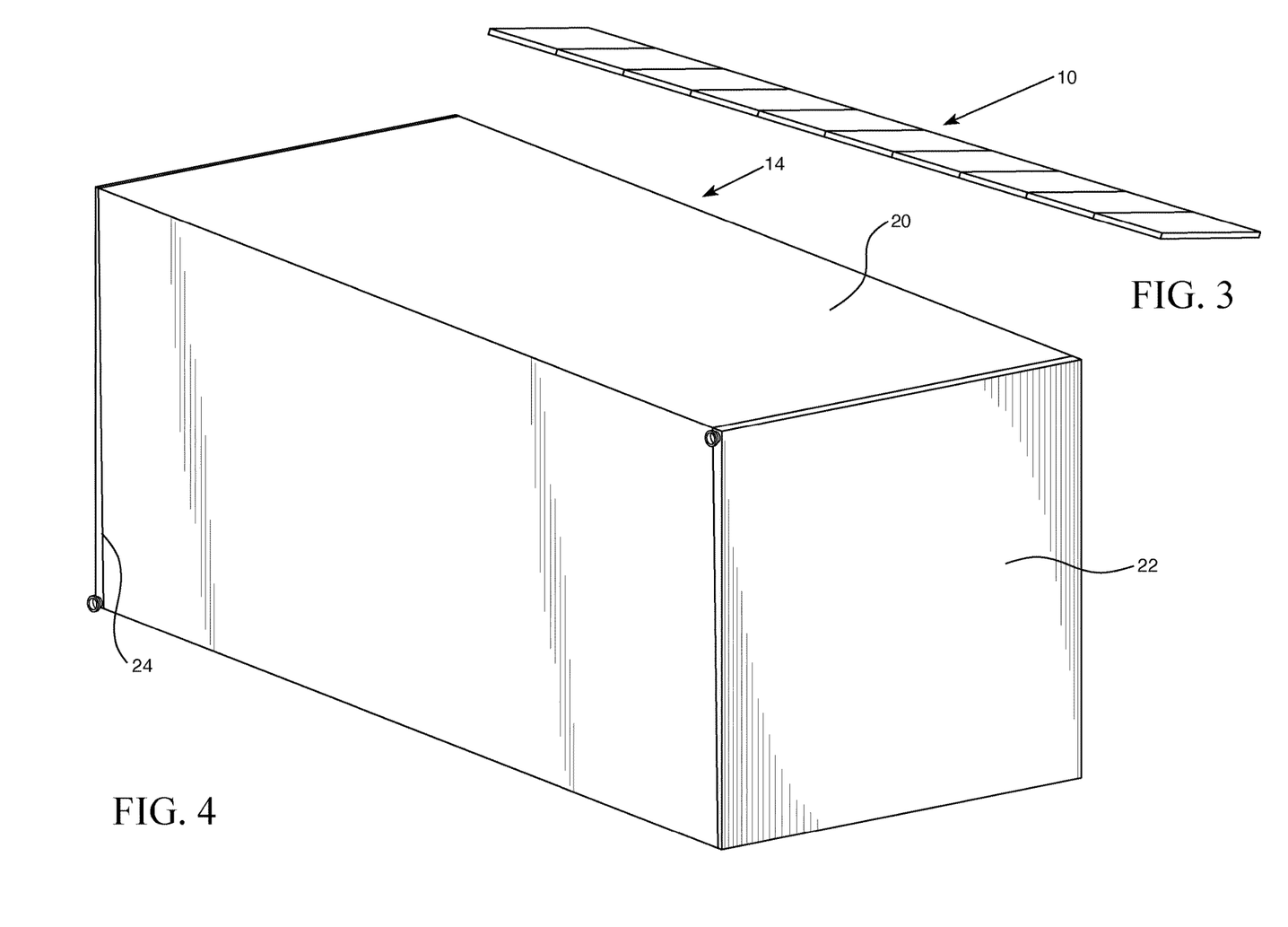
FIG. 3 is a perspective view of one of the concrete plates.
FIG. 4 is a perspective view of the entire assembled energy storage device housing.
Figure 5:
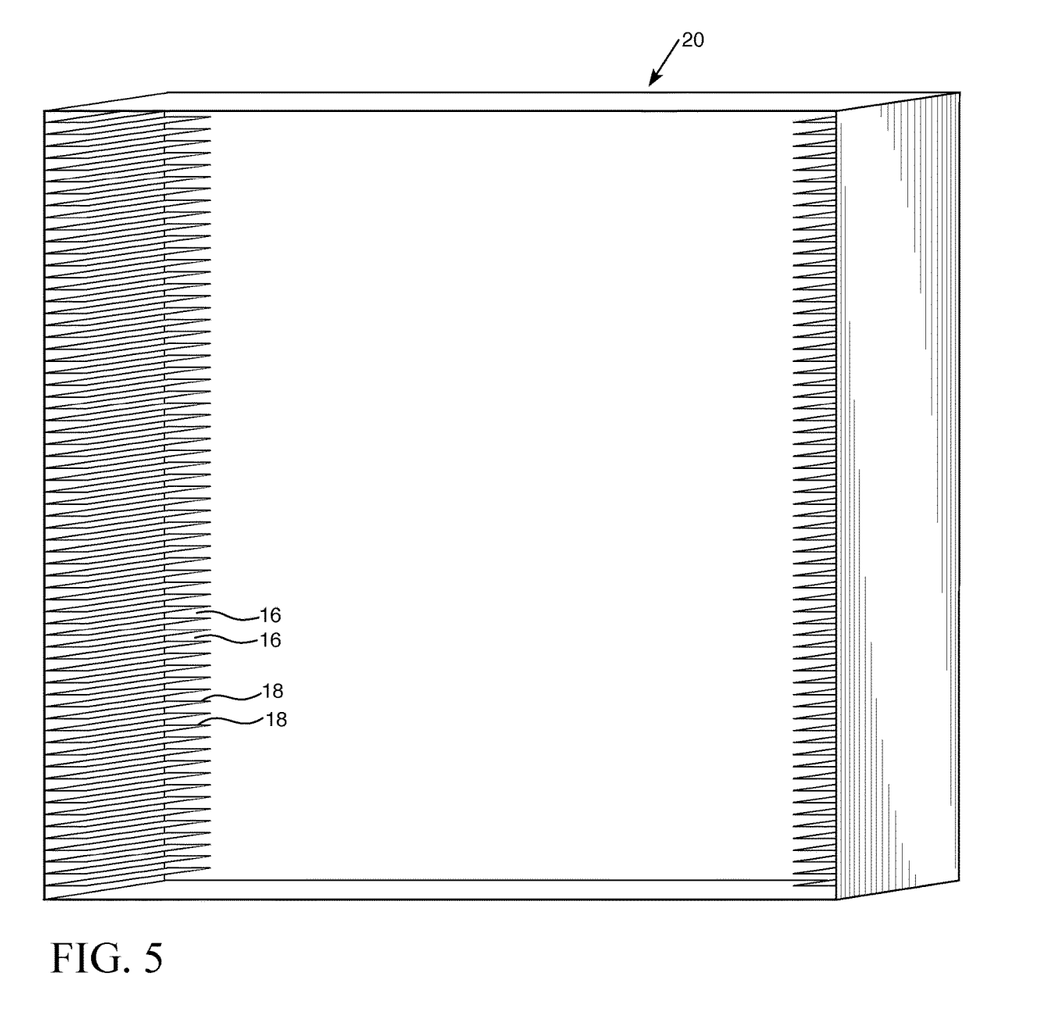
FIG. 5 is a perspective view of the outer elongated shell that extends the longitudinal extent of the housing, with the plate holders shown in a position that would support the plates horizontally.
Figure 6:
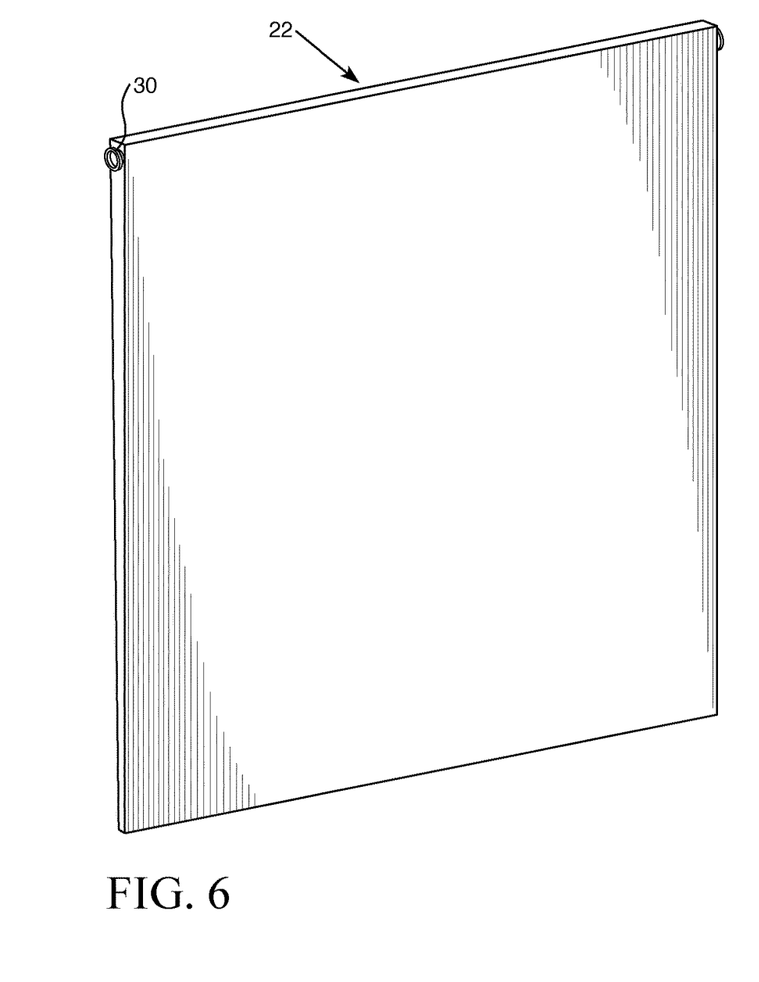
FIG. 6 is a perspective view of one end cap that closes off one end of the shell shown in FIG. 5.
Figure 7:
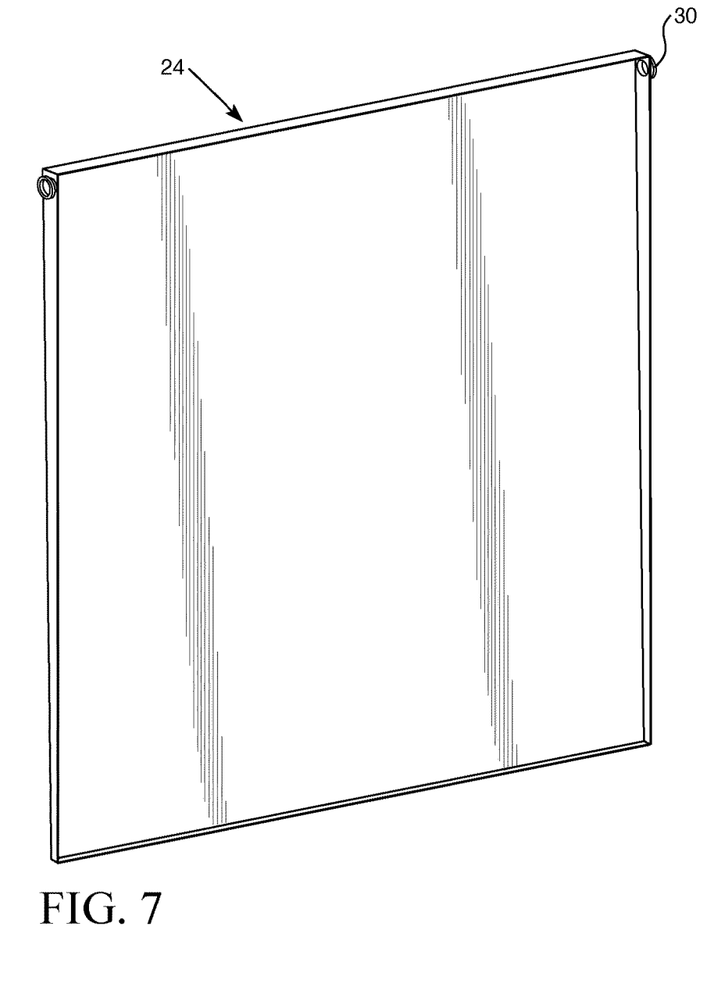
FIG. 7 is a perspective view of a second end cap that closes off the second end of the shell shown in FIG. 5 and is a mirror image of the one end cap shown in FIG. 6.

FIG. 2 shows a cutaway of a whole module 100 including all of the concrete plates 10 with a plenum 26 on either end of the elongated dimension of the concrete plates 10, with the plenum on the left side being more visible and having an inlet or outlet nozzle 30 shown in the upper left corner of the module 100. It does not make any difference if the plenum 26 on the right or the one on the left is the inlet plenum or outlet plenum, because the heat transfer medium, indicated by the double headed arrow 32 in FIG. 2, will be flowing in both directions, one direction to charge the concrete plates and the opposite direction to discharge heat from the concrete plates. FIG. 3 is a perspective view of one of the concrete plates 10. FIG. 4 shows a perspective view of the housing components assembled and FIGS. 5, 6 and 7 shows perspective views of the housing components disassembled.

Thus, this invention eliminates the need for metal piping within the module. The metal casing which is part of the functional unit, enables easy attachment of a simple plenum to each end of the flow spaces. The module 100 utilizes the beneficial thermal properties of concrete, i.e., specific heat, durability, low-cost, ready availability, etc. The module requires only relatively low pumping power to move the heat transfer medium due to the large flow space between the concrete plates and low velocities, which increases residence time and improves heat transfer. The horizontal flow arrangement permits easy inlet and outlet piping attachment and unit replacement. The horizontal arrangement also permits ease of adding "thermal breaks" by simply fluting the concrete, i.e., adding vertical grooves to the concrete, in the same guide slot. This concept further eliminates the traditional use of labor intensive rebar for reinforcement.

The heat for heating the heat transfer fluid or medium can be derived from a heat exchanger in heat exchange relationship with the primary or secondary loop of a nuclear reactor, coal plant, solar-thermal or other similar heat source. Alternately, the heat can be derived from a gas turbine cycle.

Accordingly, this invention provides the most economical energy storage currently available outside of pumped hydro or compressed air into a compatible geologic formation and does not have siting restrictions. The invention utilizes pre-existing equipment for a heat source, such as a nuclear power plant, inexpensive materials, and a simple design to solve a much grander challenge that has existed for some time without being practically addressed on a large commercial scale. The invention does not require a pressurized environment and presents a reduced risk of catastrophic safety events.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An energy storage device comprising:
a plurality of plates comprising a concrete material, supported in tandem with a flow space there between large enough to pass a heat transfer medium substantially over a face of the plates, wherein each of the plates is fluted with a plurality of flutes along a direction perpendicular to a direction of flow of the heat transfer medium through the flow space to provide thermal breaks;
an inlet plenum configured to receive the heat transfer medium from a source and distribute the heat transfer medium through the flow space; and
an outlet plenum configured to receive the heat transfer medium from the flow space and dispense the heat transfer medium to a return destination;
wherein a portion of heat in the heat transfer medium is transferred to the plates in a charging mode of operation or a portion of heat in the plates is transferred to the heat transfer medium in a discharging mode of operation.

2. The energy storage device of claim 1 wherein the plurality of plates are housed in an outer casing.

3. The energy storage device of claim 1 wherein the plates are supported to extend horizontally, spaced from one another, so the heat transfer medium flows horizontally between the plates.

4. The energy storage device of claim 1 wherein the heat transfer medium flows in parallel through the flow space between the plates.

5. The energy storage device of claim 1 wherein the heat transfer medium is an oil or salt.

6. The energy storage device of claim 1 wherein the thermal breaks are configured to slow thermal diffusion along the plates following a partial charge.

7. The energy storage device of claim 1 wherein the fluting occurs approximately every six inches to four feet along a length of the plates.

8. The energy storage device of claim 1 wherein the flow space between the plates includes insulation.

9. The energy storage device of claim 1 wherein the energy storage device is configured to operate approximately between 212° F. and 599° F.

10. The energy storage device of claim 1 wherein the energy storage device is configured so the charging and discharging modes of operation are respectively in an opposite fluid flow direction equivalent to a counter-flow heat exchanger's operation.

11. The energy storage device of claim 1 wherein the plates comprise micro rebar.

12. A method of storing thermal energy comprising the steps of:
forming a heat transfer module having a plurality of heat transfer plates comprising a concrete material, that are spaced from each other and supported in tandem to form a flow space there between, with the heat transfer plates enclosed within a housing having an inlet plenum at one end of the flow spaces and an outlet plenum at another end of the flow spaces;
imparting a plurality of thermal breaks to the heat transfer plates, wherein the plurality of thermal breaks comprise a plurality of flutes that extend in a direction perpendicular to a direction of flow of a heat transfer medium;
directing the heat transfer medium through the inlet plenum and over a face of and between the plurality of heat transfer plates;
transferring heat from the heat transfer medium to the heat transfer plates in a charging mode of operation or transferring heat from the heat transfer plates to the heat transfer medium is a discharging mode of operation; and exiting the heat transfer medium from the housing through the outlet plenum.

13. The method of claim 12 wherein the directing step includes the step of directing the heat transfer medium in parallel and horizontally over and between the plurality of heat transfer plates.

14. The method of claim 12 including the step of reinforcing the heat transfer plates with micro rebar.

15. The method of claim 12 including the step of operating the heat transfer module approximately between 212° F. and 599° F.

16. The method of claim 12 wherein the charging mode of operation, in which heat is transferred from the heat transfer medium to the heat transfer plates, and the discharging mode of operation, in which heat is transferred from the heat transfer plates to the heat transfer medium, are respectively performed in opposite fluid flow directions, equivalent to a counter-flow heat exchanger's operation.

17. The method of claim 12 wherein the thermal breaks impede heat from moving down a length of the heat transfer plates.

18. The method of claim 12 including the step of spacing the flutes six inches to four feet apart along a length of the heat transfer plates.

19. An energy storage device comprising:
a plurality of plates comprising a concrete material, supported in tandem with a flow space there between large enough to pass a heat transfer medium substantially over a face of the plates, wherein at least one of the plates comprises a plurality of grooves defined therein to provide thermal breaks, wherein the plurality of grooves extend in a direction perpendicular to a direction of flow of the heat transfer medium;
an inlet plenum configured to receive the heat transfer medium from a source and distribute the heat transfer medium through the flow space; and
an outlet plenum configured to receive the heat transfer medium from the flow space and dispense the heat transfer medium to a return destination;
wherein a portion of heat in the heat transfer medium is transferred to the plates in a charging mode of operation or a portion of heat in the plates is transferred to the heat transfer medium in a discharging mode of operation.

20. The energy storage device of claim 19, wherein the plurality of grooves comprise a uniform groove.

* * * * *